(12) United States Patent
Boic (10) Patent No.: US 10,579,664 B2
(45) Date of Patent: Mar. 3, 2020

(54) DEVICE-CENTRIC MEDIA PRIORITIZATION SYSTEMS AND METHODS

(71) Applicant: REALNETWORKS, INC., Seattle, WA (US)

(72) Inventor: Milko Boic, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 182 days.

(21) Appl. No.: 15/791,214

(22) Filed: Oct. 23, 2017

(65) Prior Publication Data
US 2018/0143977 A1 May 24, 2018

Related U.S. Application Data

(63) Continuation-in-part of application No. 15/098,243, filed on Apr. 13, 2016, which is a continuation-in-part
(Continued)

(51) Int. Cl.
*G06F 16/00* (2019.01)
*G06F 16/41* (2019.01)
(Continued)

(52) U.S. Cl.
CPC .......... *G06F 16/41* (2019.01); *G06F 16/4387* (2019.01); *G06F 16/44* (2019.01);
(Continued)

(58) Field of Classification Search
CPC ...... G06F 16/4387; G06F 16/41; G06F 16/44; G06F 16/00; G06F 17/30; G06F 16/835;
(Continued)

(56) References Cited

U.S. PATENT DOCUMENTS 6,847,959 B1 1/2005 Arrouye et al.
7,716,220 B2 * 5/2010 Michelitsch ........ G06F 16/9535
707/736
(Continued)

FOREIGN PATENT DOCUMENTS

JP 2003-99304 A 4/2003
JP 2005-44104 A 2/2005
(Continued)

OTHER PUBLICATIONS

Burger, "How Fast is Realtime? Human Perception and Technology," Feb. 9, 2015, URL=https://www.pubnub.com/blog/2015-02-09-how-fast-is-realtime-human-perception-and-technology/, download date Oct. 24, 2017, 66 pages.
(Continued)

Primary Examiner — Anh Ly
(74) Attorney, Agent, or Firm — Seed IP Law Group LLP (57) ABSTRACT

In a system comprising media files resident on various devices which can interconnect and provide indices of their media library content, an organization method may provide an aggregate view of the media library of all connected devices ordering the media library contents of various connected devices from the point of view of the device from which the view of the aggregate library will be shown. This point-of-access-centric view of the library may be formed by prioritizing one or more of relevance, reliability, or proximity of the connected devices from the perspective of the viewing device.

19 Claims, 8 Drawing Sheets

Related U.S. Application Data of application No. 14/480,497, filed on Sep. 8, 2014, now abandoned.

(60) Provisional application No. 61/874,923, filed on Sep. 6, 2013.

(51) Int. Cl.

| | | |
|---|---|---|
| *H04L 29/06* | (2006.01) | |
| *H04L 29/08* | (2006.01) | |
| *G06F 16/44* | (2019.01) | |
| *G06F 16/438* | (2019.01) | |

(52) U.S. Cl.
CPC .......... *H04L 65/60* (2013.01); *H04L 67/1097* (2013.01); *H04L 67/2842* (2013.01)

(58) Field of Classification Search
CPC ...... G06F 16/21; G06F 16/86; G06F 16/1744; G06F 16/258; G06F 16/90; G06F 16/907; G06F 16/337; G06F 21/10; G06F 2221/2113; G06F 16/2462; G06F 16/9014; G06F 16/2455; G06F 16/9026; G06F 16/3347; H04L 67/1097; H04L 67/2842; H04L 65/60; H04L 67/306; H04L 65/4069; H04N 21/47202; H04N 7/17318; H04N 21/812; H04N 65/4069; G11B 27/034; G06Q 50/01; G06Q 10/00
See application file for complete search history.

(56) References Cited

U.S. PATENT DOCUMENTS

| | | | |
|---|---|---|---|
| 7,774,235 B2 | 8/2010 | Browne et al. | |
| 7,805,315 B2 | 9/2010 | Goel | |
| 7,948,906 B1 | 5/2011 | Patel et al. | |
| 7,987,280 B1* | 7/2011 | Putnam | H04L 65/1076 704/219 |
| 8,055,749 B1* | 11/2011 | Paleja | H04L 41/0823 709/223 |
| 8,135,761 B2 | 3/2012 | Watson et al. | |
| 8,386,728 B1 | 2/2013 | Ionescu et al. | |
| 9,031,953 B2 | 5/2015 | Rathnavelu et al. | |
| 9,165,046 B2 | 10/2015 | Blanding | |
| 2002/0194194 A1* | 12/2002 | Fenton | G06F 16/958 707/E17.116 |
| 2003/0055823 A1 | 3/2003 | Shibanuma | |
| 2003/0056931 A1* | 3/2003 | Wuthrich | B22D 17/145 164/305 |
| 2003/0233241 A1* | 12/2003 | Marsh | G06F 16/48 725/14 |
| 2005/0027673 A1 | 2/2005 | Moritani et al. | |
| 2005/0033728 A1 | 2/2005 | James et al. | |
| 2005/0149213 A1* | 7/2005 | Guzak | G06F 9/451 700/94 |
| 2005/0169467 A1* | 8/2005 | Risan | G11B 20/00086 380/201 |
| 2005/0192966 A1 | 9/2005 | Hilbert et al. | |
| 2006/0039314 A1 | 2/2006 | Narayanan | |
| 2007/0089110 A1 | 4/2007 | Li | |
| 2007/0233702 A1 | 10/2007 | Ohkita et al. | |
| 2008/0010119 A1* | 1/2008 | Oliveira | G06Q 30/02 705/14.55 |
| 2008/0189169 A1* | 8/2008 | Turpin | G06Q 30/02 705/7.33 |
| 2008/0288411 A1* | 11/2008 | Copley | G06F 21/10 705/52 |
| 2009/0080870 A1* | 3/2009 | Mudie | H04N 5/76 386/232 |
| 2009/0249222 A1 | 10/2009 | Schmidt et al. | |
| 2010/0100899 A1* | 4/2010 | Bradbury | H04N 7/17318 725/29 |
| 2011/0026898 A1* | 2/2011 | Lussier | G11B 27/034 386/280 |
| 2011/0185045 A1 | 7/2011 | Rieger | |
| 2011/0276396 A1 | 11/2011 | Rathod | |
| 2012/0030376 A1 | 2/2012 | Lemus et al. | |
| 2012/0069131 A1* | 3/2012 | Abelow | G06Q 10/067 348/14.01 |
| 2012/0159337 A1* | 6/2012 | Travilla | G06Q 30/0631 715/738 |
| 2013/0045729 A1* | 2/2013 | Haik | H04W 4/029 455/418 |
| 2013/0132350 A1 | 5/2013 | Mooneyham | |
| 2013/0172041 A1 | 7/2013 | Garg et al. | |
| 2013/0246448 A1* | 9/2013 | Sa | G06F 16/954 707/758 |
| 2014/0006951 A1* | 1/2014 | Hunter | H04H 60/31 715/719 |
| 2017/0046350 A1* | 2/2017 | Lunsford | G06F 16/44 |

FOREIGN PATENT DOCUMENTS

| | | | |
|---|---|---|---|
| JP | 2005-251194 A | 9/2005 | |
| JP | 2007-272836 A | 10/2007 | |
| JP | 2009-17407 A | 1/2009 | |
| JP | 2013-128310 A | 6/2013 | |

OTHER PUBLICATIONS

Crouch, "*Apple* v. *Samsung*: Adding Elements to Avoid Infringement," Oct. 17, 2012, URL=https://patentlyo.com/patent/2012/10/apple-v-samsung-adding-elements-to-avoid-infringement.html, download date Jun. 19, 2017, 3 pages.

Duin, "Roku Search: Search across 20 Streaming Channels for Movies, TV Shows, Actors and Directors!" Sep. 8, 2015, URL=https://blog.roku.com/blog/2015/09/08/roku-search-search-across-20-streaming-channels-for-movies-tv-shows-actors-and-directors/, download date Jun. 29, 2017, 6 pages.

Markworth, "Introducing Roku Search [Video]," Oct. 29, 2012, URL=https://blog.roku.com/blog/2012/10/29/roku-search/, download date Jun. 19, 2017, 4 pages.

Parasuraman et al., "A Model for Types and Levels of Human Interaction with Automation," *IEEE Transactions on Systems, Man, and Cybernetics—Part A: Systems and Humans* 30(3):286-297, May 2000.

Landström, "Congestion Control in Wireless Cellular Networks," doctoral thesis, Luleå University of Technology, Luleå, Sweden, Mar. 2005, 99 pages.

Maynard, "Things I wish I knew about MongoDB a year ago," Oct. 17, 2012, URL=http://snmaynard.com/2012/10/17/things-i-wish-i-knew-about-mongodb-a-year-ago/, download date Feb. 13, 2018, 8 pages.

Poole, "Cellular Handover and handoff," archived Jul. 14, 2011, URL=https://web.archive.org/web/20110714192327/http ://www.radio-electronics.com/info/cellulartelecomms/cellular_concepts/handover_handoff.php, download date Feb. 13, 2018, 4 pages.

Rao et al., "Energy Efficient Dynamic Group Caching in Mobile Ad hoc Networks for Improving Data Accessibility," *International Conference on Recent Trends in Information Technology*, Chennai, India, Apr. 19-21, 2012, pp. 372-376.

Stevens, "TCP Slow Start, Congestion Avoidance, Fast Retransmit, and Fast Recovery Algorithms," RFC 2001 Memo, Network Working Group, Jan. 1997, URL=https://tools.ietf.org/html/rfc2001, download date Feb. 13, 2018, 7 pages.

Tan et al., "Algorithm for Layered Sorting and Merging of P2P Information Retrieval," *International Journal of Computer Science and Network Security* 8(1):41-48, 2008.

Walles et al., "gtk-gnutella: Default sort order should be highest # hits on top," Debian Bug report logs—#327194, Sep. 8, 2005, URL=https://bugs.debian.org/cgi-bin/bugreport.cgi?bug=327194, download date Feb. 13, 2018, 5 pages.

(56) References Cited

OTHER PUBLICATIONS

Tsukasa, File: Gtk-gnutella-0.96b.png Jan. 31, 2006, wikimedia.org, https://commons.wikimedia.org/wiki/File:Gtk-gnutella-0.96b.png.

* cited by examiner

DEVICE-CENTRIC MEDIA PRIORITIZATION SYSTEMS AND METHODS

CROSS-REFERENCE TO RELATED APPLICATIONS

This application claims the benefit of priority to Provisional Patent Application No. 61/874,923 titled MULTI-DEVICE DISTRIBUTED MEDIA LIBRARY ORGANIZATION SYSTEMS AND METHODS and to Non-Provisional patent application Ser. No. 14/480,497 titled DEVICE-CENTRIC MEDIA PRIORITIZATION SYSTEMS AND METHODS and to Non-Provisional patent application Ser. No. 15/098,243 titled DEVICE-CENTRIC MEDIA PRIORITIZATION SYSTEMS AND METHODS, all naming inventor Milko BOIC. All of the foregoing except the patent application Ser. No. 15/098,243 are hereby incorporated by reference, in their entirety, for all purposes.

FIELD

This disclosure is directed to the field of digital data handling, and more particularly to prioritizing a piece of media content with respect to other pieces of media content in a distributed-media-library system from a perspective of a viewing device.

BACKGROUND

Various media systems allow different devices to share locally-hosted media files with other devices connected via a network. A user may desire to view an aggregated view of media content that is available across various devices within such a media-sharing group. Existing methods of sorting, presenting, and/or indexing aggregated media content may allow a user to sort or organize a view of an aggregated media library according to various factors, such as by file creation and/or modification date. However, in an aggregated media library, organizing media content according to such factors may fail to promote remote and/or aggregated content from the perspective of a viewing device.

DESCRIPTION

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

A distributed-media-library system typically includes many pieces of media content distributed across a number of different devices, clouds, and/or other media repositories that are all associated with a given user. As the term is used herein, a "piece of media content" refers to particular audio and/or video content that may exist in multiple forms within the distributed-media-library system. For example, a particular audio track from a particular CD may be a piece of media content that corresponds to an uncompressed ".wav" media file and that also corresponds to a compressed ".mp3" file. The uncompressed file and the compressed media file are considered to be different versions of the same piece of media content (the particular track).

Other examples of distinct pieces of media content include a particular episode of a particular TV show, a particular image captured by a particular capture device, and a particular video and/or sound recording made by a particular capture device. Each of such pieces of media content could exist in multiple versions (e.g., in different container formats, in different resolutions, in different codecs, and the like) in multiple media files. But all such derivative media files are considered to correspond to the same piece of media content.

As discussed above, the distributed-media-library system may include several media files that are all different versions a given piece of media content. Such media files often are copied from device to device within the distributed-media-library system, and it is common for the distributed-media-library system to include several versions and/or copies of the given piece of media content. Frequently, the different versions and/or copies of the given piece of media content may have been introduced to different media-library devices at different dates and/or times. For example, one version or copy of the given piece of media content may have resided on media-library device "A" for months or years, while another version or copy of the given piece of media content may have been introduced to media-library device "B" only recently.

When the user views content in the distributed-media-library system from a given viewing device, relevant and/or recent content may be prioritized. The relevance and/or recency are determined from a device-centric point of view, such that pieces of media content that are recently introduced and/or otherwise relevant to the given viewing device takes precedence over piece of media content that may be recently introduced and/or otherwise relevant to other of the user's devices that may be less closely associated with the given viewing device.

Different media-library devices that all store a copy and/or version of the given piece of media content may be prioritized according to how closely they are associated with the given viewing device. For example, in one embodiment, the given viewing device itself may be prioritized highly, as may a "cloud" media-repository that is always or nearly always available to the given viewing device, such that it can be treated as a very close extension of the given viewing device. Other of the user's media-library devices that are always or nearly always on and that frequently communicate with the given viewing device may be given a secondary priority (e.g., a media PC may be given a secondary priority with respect to a mobile phone, tablet, or other mobile media-viewing device). Other of the user's media-library devices and/or storage repositories that either do not typically store a lot of media content or that do not frequently communicate with the given viewing device may be given a tertiary priority (e.g., a user's tablet may be given a tertiary priority with respect to the user's mobile phone).

When presented on the given viewing device among other pieces of media content in the distributed-media-library system, the given piece of media content may be sorted according to its introduction date and/or time on a highly prioritized media-library device, where the prioritization is determined from the perspective of a viewing device, as discussed above. As a result, the given piece of media content may assume a different sorted position among other content in the user's distributed media library when that library is viewed from different devices.

If two or more media-library devices all have copies and/or versions of the given piece of media content, and all have the same and/or very similar priorities with respect to the given viewing device, then either an earliest or a latest introduction date and/or time may be determined among the members of that priority group. Selecting an earliest introduction date and/or time may promote stability within media content listings, as moving a piece of media content among members of a priority group will not affect the sorted position of the piece of media content in listings when viewed from a viewing device that is closely associated with members of the group. By contrast, selecting a latest introduction date and/or time will cause the sorted position of the piece of media content to be promoted when the piece of media content is moved among members of the group and viewed from a closely-associated viewing device.

More particularly, as discussed herein, in various embodiments, a processor and/or processing device may be configured (e.g., via non-transitory computer-readable storage media) to perform a first method for prioritizing a piece of media content with respect to other pieces of media content in a distributed-media-library system from a perspective of a viewing device, the first method including steps similar to some or all of the following:

identifying a plurality of media-library devices that collectively store a plurality of media files, each of which comprises a version of the piece of media content, at least some of which are associated with differing sort metadata;

determining a plurality of priority metrics corresponding respectively to the plurality of media-library devices, each priority metric measuring an association between one of the plurality of media-library devices and the viewing device;

selecting, according to the plurality of priority metrics, a media-library device that is closely-associated with the viewing device, the closely-associated media-library device storing a selected media file of the plurality of media files;

determining, based on the sort metadata associated with the selected media file, a viewing-device-centric sort key for the piece of media content;

sorting the piece of media content according to the viewing-device-centric sort key with respect to the other pieces of media content when the piece of media content is viewed from the perspective of the viewing device; and/or sorting the piece of media content according to a second viewing-device-centric sort key with respect to the other pieces of media content when the piece of media content is viewed from a perspective of a second viewing device.

In some cases, the viewing-device-centric sort key may include a date and/or time at which the selected media file was introduced onto the closely-associated media-library device, or the like.

In some cases, selecting the closely-associated media-library device may include steps similar to some or all of the following:

selecting a priority group comprising at least two of the plurality of media-library devices that are equally closely associated with the viewing device;

identifying at least two of the plurality of media files as being stored respectively by the priority group; and selecting the closely-associated media-library device from among the priority group based on sort metadata associated with the at least two of the plurality of media files, or the like.

In some cases, selecting the closely-associated media-library device from among the priority group may include steps similar to some or all of the following:

selecting the closely-associated media-library device onto which one of the plurality of media files was introduced more recently than others of the priority group; and/or selecting the closely-associated media-library device onto which one of the plurality of media files was introduced less recently than others of the priority group.

In some cases, each priority metric measures a period of time since the viewing device and one of the plurality of media-library devices were connected to one another.

In some cases, the closely-associated media-library device is the viewing device.

Described more fully below are many additional details, variations, and embodiments that may or may not include some or all of the steps, features, and/or functionality described above.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

Figure 1:
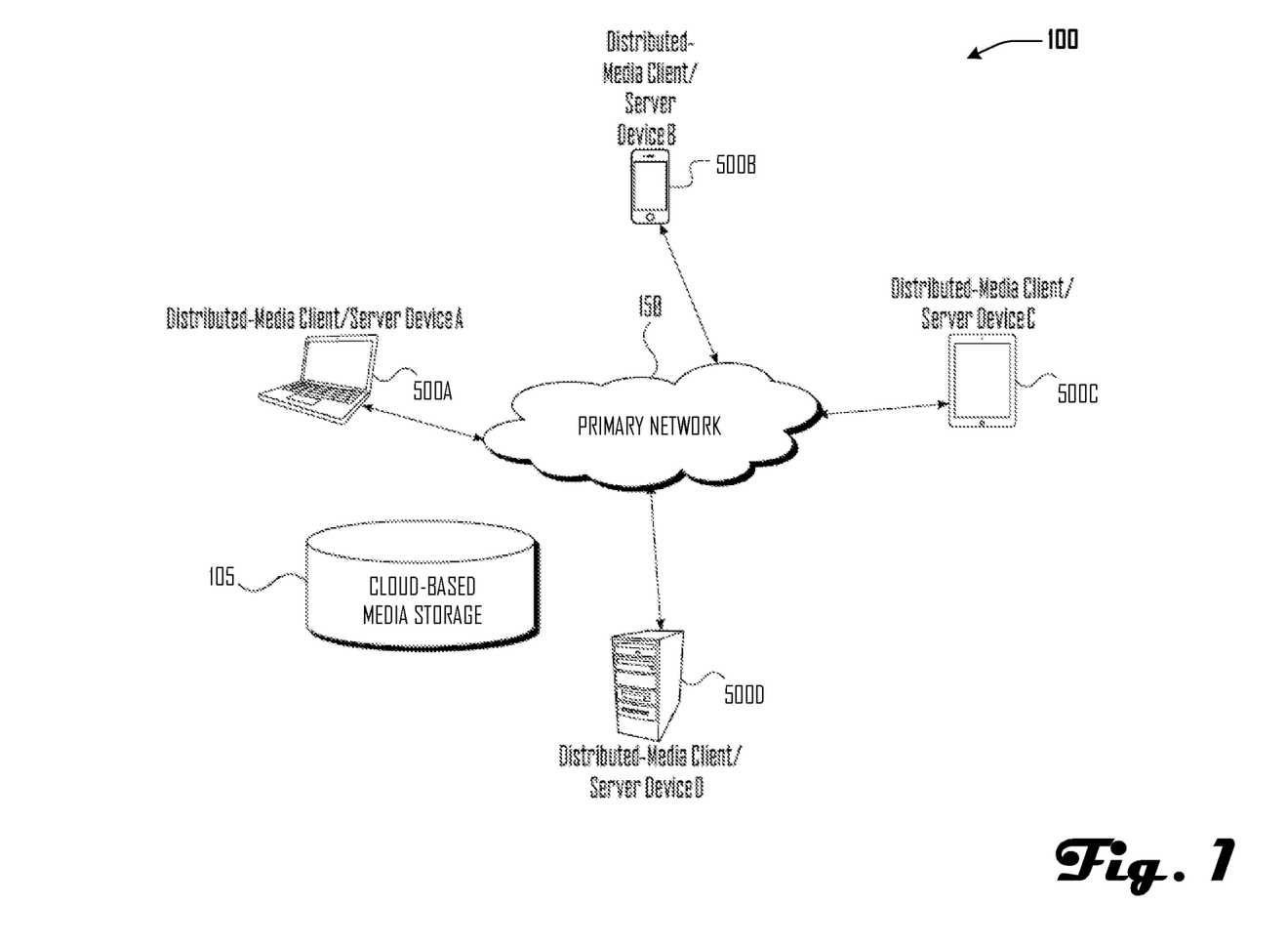
FIG. 1 depicts a simplified device-centric media prioritization system in which several distributed-media client/server devices and cloud-based media storage are connected to a network.

FIG. 1 illustrates a simplified device-centric media prioritization system 100 in which several distributed-media client/server devices 500A-D and cloud-based media storage 105 are connected to primary network 150. "Device-centric" is not used herein to describe a value that is merely specific to a given device, but instead refers to expressions of one or more quantified attributes (a plurality of bits or similar digital expression of positive or negative scale, e.g.) of the connection between the given device (a viewing device or other media data destination, e.g.) and the location of each item or grouping of media content, for example, designated as available.

In various embodiments, primary network 150 may include the Internet, a local area network ("LAN"), a wide area network ("WAN"), and/or other data network.

In various embodiments, additional infrastructure (e.g., cell sites, routers, gateways, firewalls, and the like), as well as additional devices may be present. However, it is not necessary to show such infrastructure and implementation details in FIG. 1 in order to describe an illustrative embodiment.

In an exemplary scenario, media files may be resident on various interconnected devices (such as distributed-media client/server devices 500A-D) and storage facilities (such as cloud-based media storage 105) that share media library content. At least some of the devices may include media scanners, media clients, and/or media servers. The devices themselves can interconnect via media servers and media clients resident thereon.

Figure 2:
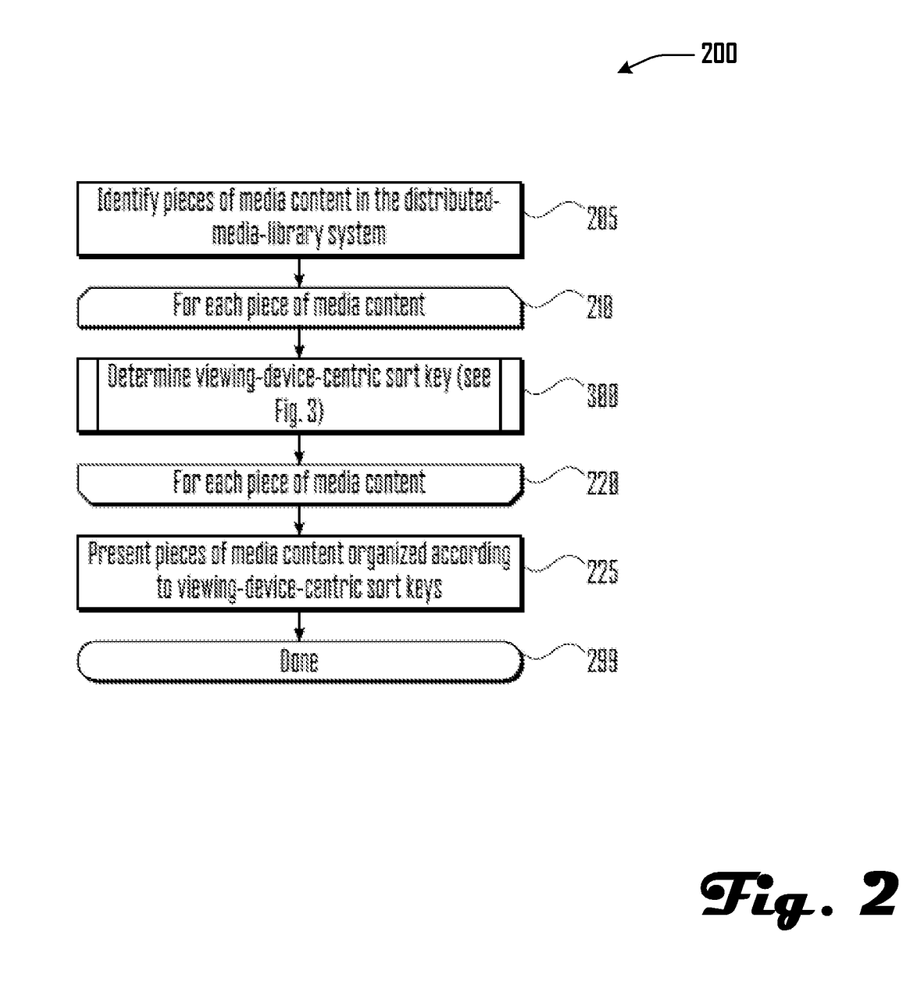
FIG. 2 depicts a routine for presenting pieces of media content in a distributed-media-library system from the perspective of a given viewing device, such as may be performed by a distributed-media client/server device in accordance with one or more embodiments.

FIG. 2 illustrates a routine 200 for presenting pieces of media content in a distributed-media-library system from the perspective of a given viewing device, such as may be performed by a distributed-media client/server device 500 in accordance with one or more embodiments.

In block 205, routine 200 identifies one or more pieces of media content that are available in the distributed-media-library system, e.g., from a local datastore, such as local media datastore 540, and from one or more remote distributed-media client/server devices.

Beginning in opening loop block 210, routine 200 processes each piece of media content in turn.

In subroutine block 300, routine 200 calls subroutine 300 (see FIG. 3, discussed below) to determine a viewing-device-centric sort key to prioritize the current piece of media content with respect to other pieces of media content in the distributed-media-library system.

In ending loop block 220, routine 200 iterates back to opening loop block 210 to process the next piece of media content, if any.

Once each piece of media content has been prioritized, in block 225, routine 200 sorts and presents the pieces of media content according to the determined viewing-device-centric sort keys when viewed from the perspective of the given viewing device.

Routine 200 ends in ending block 299.

Figure 3:
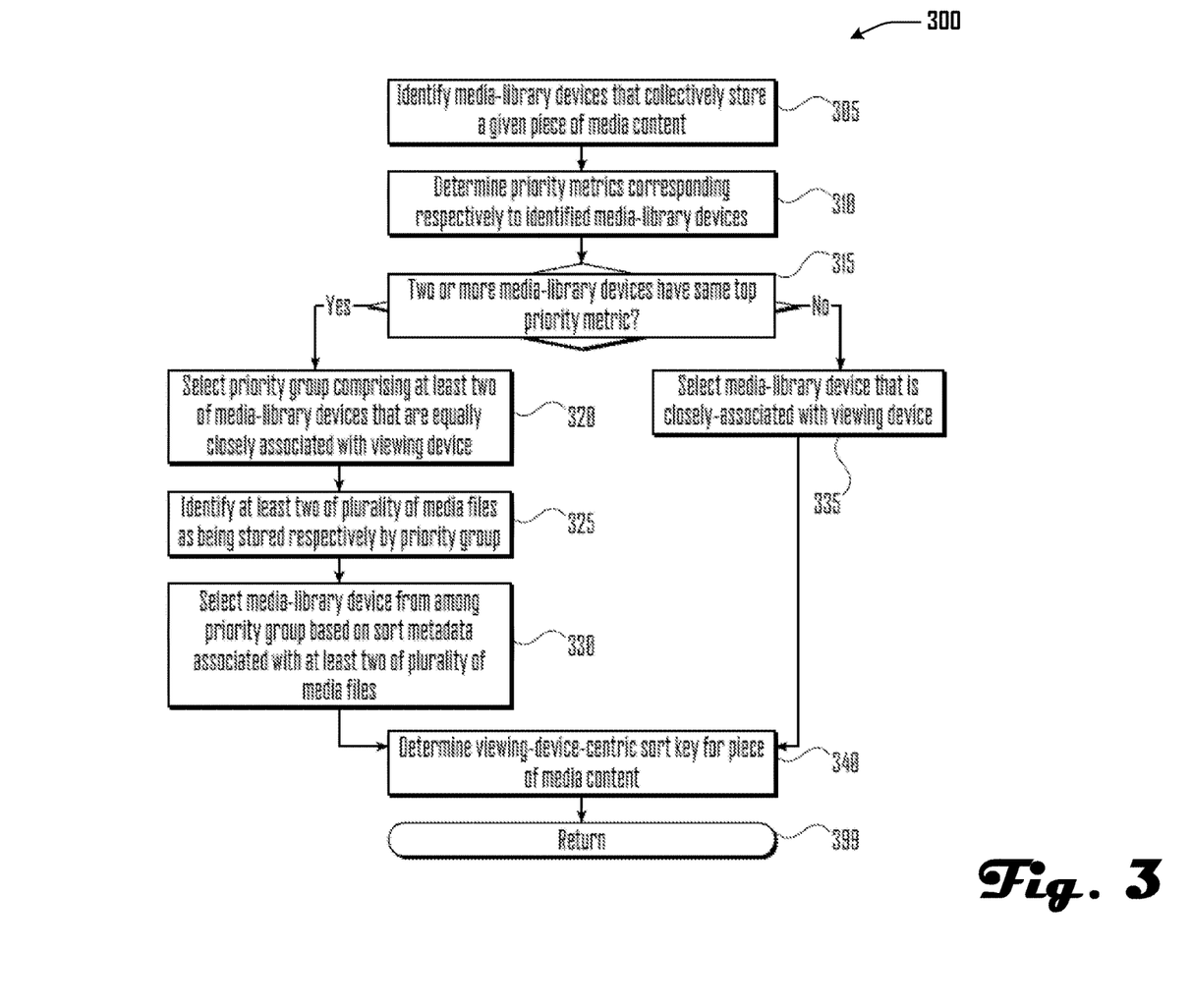
FIG. 3 depicts a sort-key subroutine for prioritizing a given piece of media content from the perspective of a given viewing device, such as may be performed by a distributed-media client/server device in accordance with one or more embodiments.

FIG. 3 illustrates a sort-key subroutine 300 for prioritizing a given piece of media content from the perspective of a given viewing device, such as may be performed by a distributed-media client/server device 500 in accordance with one or more embodiments.

In block 305, sort-key subroutine 300 identifies one or more media-library devices that collectively store one or more media files that are versions and/or copies of the given piece of media content. Typically, at least some of the different media files are associated with differing sort metadata. For example, in one embodiment, the sort metadata may indicate a date and/or time at which a media file corresponding to the given piece of media content was copied to, stored on, or otherwise introduced to a media-library device. In other embodiments, the sort metadata may indicate a date and/or time at which a media file corresponding to the given piece of media content was played, viewed, edited, and/or otherwise interacted with by a user.

Beginning in opening loop block 310, sort-key subroutine 300 processes each identified media-library device in turn.

In block 315, sort-key subroutine 300 determines a priority metric corresponding to the current identified media-library device. The priority metric measures an association between the current identified media-library device and the given viewing device. In some embodiments, the priority metric measures a period of time since the given viewing device and the current identified media-library device were connected to one another.

For example, in one embodiment, if the given viewing device is a mobile device that was recently connected to a desktop/laptop media PC, then the media PC may be given a high priority metric based on the recency of the connection. Similarly, if the given viewing device recently connected to a cloud-based media repository (e.g., cloud-based media storage 105), then the cloud-based media repository may be given a high priority metric. Conversely, a media-library device that has not recently communicated with and/or been connected to the given viewing device may be given a low priority metric.

In ending loop block 320, sort-key subroutine 300 iterates back to opening loop block 310 to process the next identified media-library device, if any.

In block 325, sort-key subroutine 300 selects one or more high-priority media-library device(s) as being closely-associated with a given viewing device based on the determined priority metrics. In some embodiments, one of the selected devices may be the given viewing device itself.

In some embodiments, if two or more media-library devices have the same and/or very similar priority metrics, then in block 325, sort-key subroutine 300 may select a priority group comprising at least two of media-library devices that are equally closely associated with viewing device.

In decision block 330, sort-key subroutine 300 determines whether two or more high-priority media-library devices were selected in block 325. If so, sort-key subroutine 300 proceeds to block 335; otherwise, sort-key subroutine 300 proceeds to block 345.

In block 335, sort-key subroutine 300 identifies two or more media files that correspond to the given piece of media content and that are stored on the two or more media-library devices of the priority group selected in block 325.

In block 340, sort-key subroutine 300 selects a closely-associated media-library device from among those in the priority group based on sort metadata associated with the media files identified in block 335.

For example, in one embodiment, sort-key subroutine 300 selects a media-library device because one of the media files (identified in block 335) was introduced onto that media-library device more recently than others of the media files (selected in block 335) were introduced onto others of the priority group.

In other embodiments, sort-key subroutine 300 selects a media-library device because one of the media files (identified in block 335) was introduced onto that media-library device less recently than others of the media files (selected in block 335) were introduced onto others of the priority group.

Selecting an earlier (less recent) introduction date and/or time may promote stability within media content listings, as moving the given piece of media content among members of a priority group will not affect the sorted position of the given piece of media content in listings when viewed from a viewing device that is closely associated with members of the group. By contrast, selecting a latest (more recent) introduction date and/or time will cause the sorted position of the given piece of media content to be promoted when the given piece of media content is moved among members of the group and viewed from a closely-associated viewing device.

In some variants, sort-key subroutine 300 may subsequently identify a media file that corresponds to the given piece of media content and that is stored on the media-library device selected in block 325.

Thereafter sort-key subroutine 300 may determine, based on the sort metadata associated with the media file selected in block 340 or block 345, a viewing-device-centric sort key for the given piece of media content. In some embodiments, the viewing-device-centric sort key may comprise a date and/or time at which the selected media file was introduced onto the closely-associated media-library device.

Sort-key subroutine 300 ends in ending block 399, returning the viewing-device-centric sort key determined in block 350 to the caller.

Figure 4:
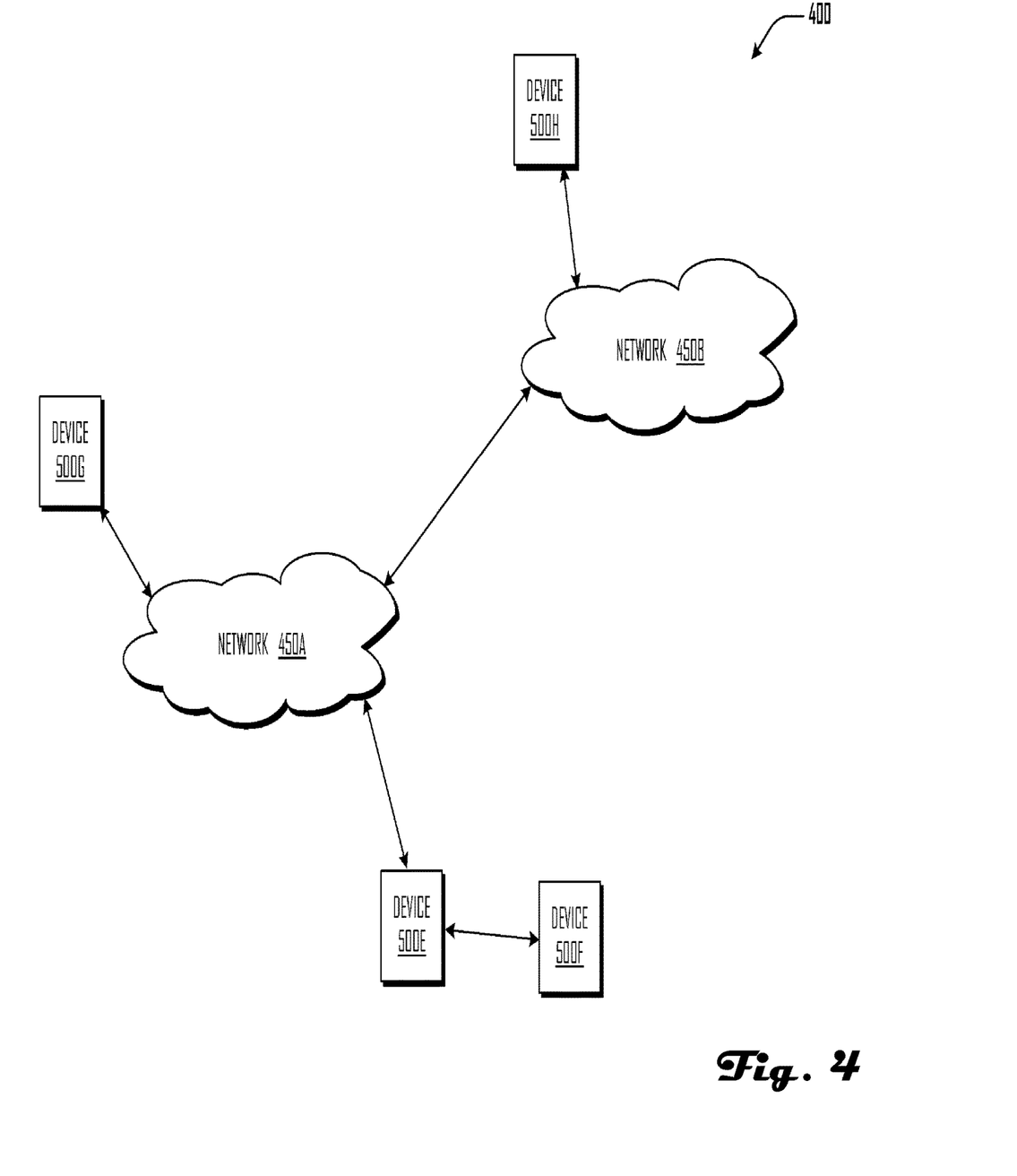
FIG. 4 depicts another device-centric media prioritization system in which several distributed-media client/server devices and cloud-based media storage are connected to a plurality of interconnected networks in accordance with one or more embodiments.

FIG. 4 illustrates a device-centric or hybrid media prioritization system 400 in which one or more distributed-media client/server devices 500E-G are connected to a local network 450A and to a central network 450B. Also as shown one or more distributed-media client/server devices 500H are connected directly to central network 450B and indirectly to local network 450A. In some variants local network 450A and central network 450B may each be an instance of a primary network 150 having cloud-based resources (cloud-based media storage 105, e.g.). This can occur, for example, in a context in which two devices 500F, 500H are presently connected, but in which the connection is so indirect or attenuated that they are effectively not associated (deemed unsuitable for time-sensitive communications therebetween due to excessive delays during peak usage times, e.g.) as further described below.

Figure 5:
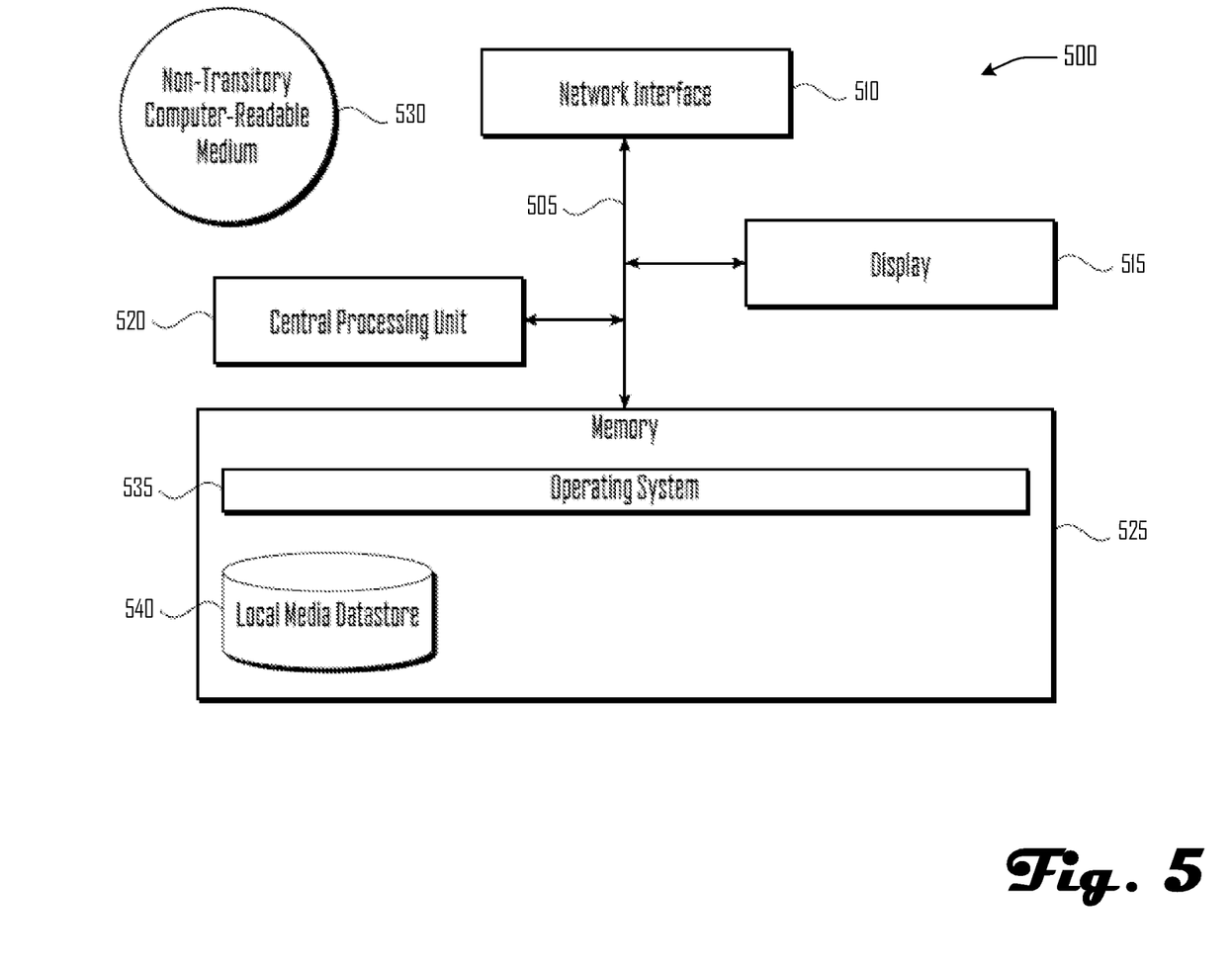
FIG. 5 depicts several components of an exemplary distributed-media client/server device in accordance with one or more embodiments.

FIG. 5 illustrates several components of an exemplary distributed-media client/server device in accordance with one or more embodiments. In various embodiments, distributed-media client/server device 500 may include a desktop PC, server, workstation, mobile phone, laptop, tablet, set-top box, appliance, or other computing device that is capable of performing operations such as those described herein. In some embodiments, distributed-media client/server device 500 may include many more components than those shown in FIG. 5. However, it is not necessary that all of these generally conventional components be shown in order to disclose an illustrative embodiment.

In various embodiments, distributed-media client/server device 500 may comprise one or more physical and/or logical devices that collectively provide the functionalities described herein. In some embodiments, distributed-media client/server device 500 may comprise one or more replicated and/or distributed physical or logical devices.

In some embodiments, distributed-media client/server device 500 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

Distributed-media client/server device 500 includes a bus 505 interconnecting several components including a network interface 510, a display 515, a central processing unit 520, and a memory 525.

Memory 525 generally comprises a random access memory ("RAM") and permanent non-transitory mass storage device, such as a hard disk drive or solid-state drive. Memory 525 stores program code for a routine 200 for presenting pieces of media content in a distributed-media-library system from the perspective of a given viewing device as described herein. In addition, the memory 525 also stores an operating system 535 and one or more media management routines as described herein. See FIGS. 2, 3, and 9-11.

These and other software components may be loaded into memory 525 of distributed-media client/server device 500 using a drive mechanism (not shown) associated with a non-transitory computer-readable medium 530, such as a floppy disc, tape, DVD/CD-ROM drive, memory card, or the like.

Memory 525 also includes local media datastore 540. In some embodiments, distributed-media client/server device 500 may communicate with local media datastore 540 via network interface 510, a storage area network ("SAN"), a high-speed serial bus, and/or via the other suitable communication technology.

Figure 6:
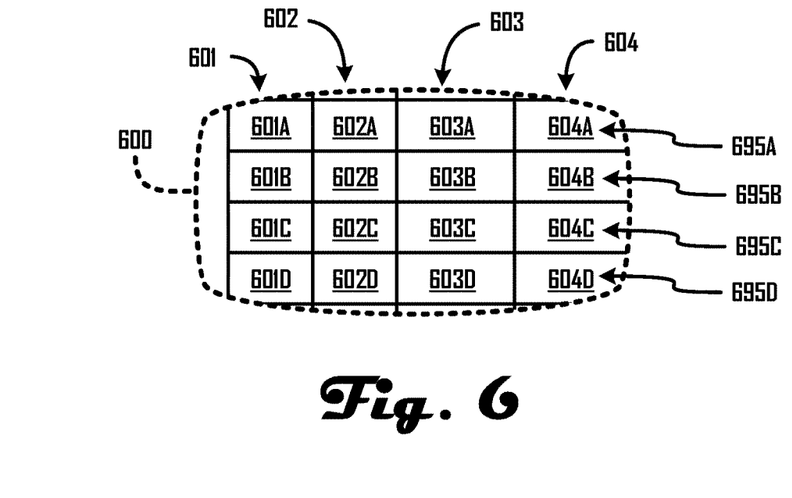
FIG. 6 depicts tabular data in an exemplary distributed-media client/server device in accordance with one or more embodiments.

FIG. 6 depicts a table 600 that may reside in an instance of a local media datastore 540 in some variants. Each record 695 of the table 600 signifies an item of media available at a particular viewing device, the device-centric sort fields 602 being usable as a device-centric sort key in generating the list to present to the user of device 500F. Each may also include one or more instances of a type index 601 (a standard movie rating equal to "G" to signify suitability for general audiences, e.g.) or other such intrinsic descriptors. As further exemplified below each record 695 may likewise include one or more instances of timestamps 603 or of other description 604 (intrinsic or extrinsic) from which device-centric sort field 602 may be derived. This can occur, for example, in a context in which the particular viewing device is device 500F; in which device 500E is the server that computes the device-centric sort fields 602; and in which the device-centric sort key causes the content items most readily accessible to that device to be listed first. Alternatively or additionally, an instance of device-centric sort fields 602 may be calibrated so that the items most relevant to that device are listed first (in terms of preferences stated by a primary user of that device, e.g.). In some variants, the device-centric sort key is then derived as an average of two or more sort fields (one favoring content items most readily accessible to that device and another favoring items most relevant to that device, e.g.).

Figure 7:
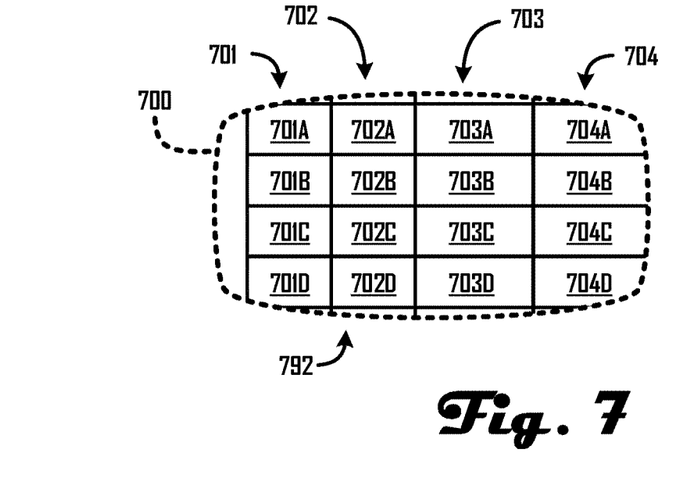
FIG. 7 depicts additional tabular data in an exemplary distributed-media client/server device in accordance with one or more embodiments.

FIG. 7 depicts a table 700 that may reside in an instance of a local media datastore 540 in some variants. Each record of the table 700 signifies an item of media available at a particular viewing device, the device-centric sort fields 702 being usable in a device-centric sort key 792 in generating the list to present to the user of device 500H. Each may also include one or more instances of a type index 701 (indicating a genre, e.g.) or other such intrinsic descriptors. As further exemplified below each record 795 may likewise include one or more instances of timestamps 703 or of other description 704 (intrinsic or extrinsic) from which device-centric sort field 702 may be derived. This can occur, for example, in a context in which the particular viewing device is a device 500H that computes its own device-centric sort fields 702; and in which the device-centric sort key causes the content items most relevant to that device to be listed first. Alternatively or additionally, an instance of device-centric sort fields 702 may be calibrated so that the items most readily accessible to that device are listed first. In some variants, the device-centric sort key is then derived as an average of two or more sort fields.

Figure 8:
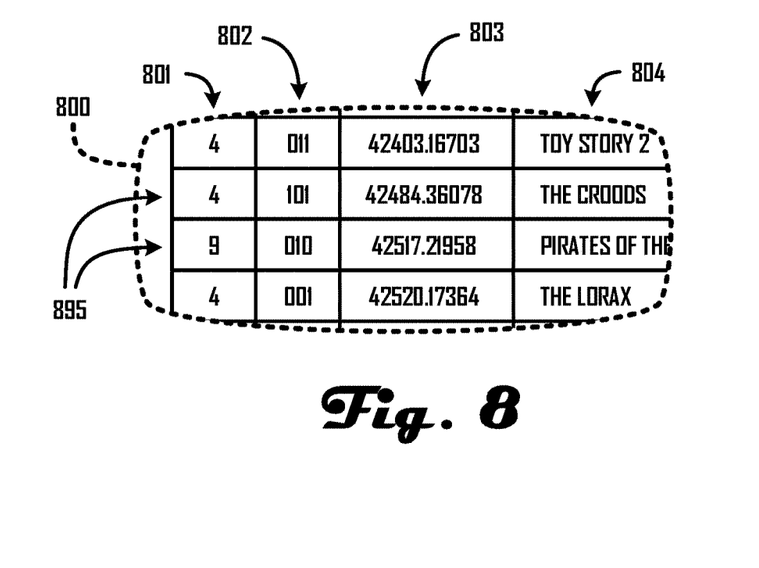
FIG. 8 depicts additional tabular data in an exemplary distributed-media client/server device in accordance with one or more embodiments.

FIG. 8 depicts a table 800 that may instantiate table 600 or table 700, as described above, in some variants. Each record 895 of table 800 signifies an item of media available at a particular viewing device, the device-centric sort fields 802 being usable in a device-centric sort key in generating the list to present to the user of the device. Each may also include one or more instances of a type index 801 (a numerical category indicating a type of movie, e.g.) or other such intrinsic content descriptors. As further exemplified below each record may likewise include one or more instances of timestamps 803 (presented as a number of days, e.g.) or of other description 804 (including a movie title, e.g.) from which device-centric sort field 802 may be derived. This can occur, for example, in a context in which table 800 is initially stored in an incoming order or other order unrelated to the sort key and in which the sort key is used upon a request to display the table from a particular device's point of view. In some variants, table 800 includes two or more device-centric sort keys each signaling a respective device's perspective (e.g. containing two or more sort fields 602, 802 respectively corresponding to different devices 500E, 500H).

Figure 9:
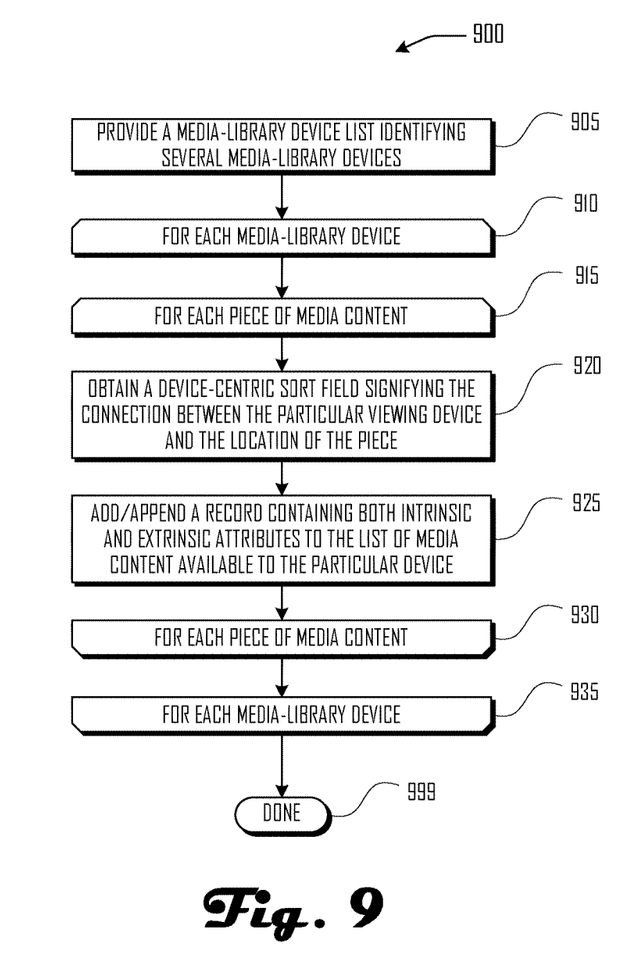
FIG. 9 depicts a table setup routine, such as may be performed by a distributed-media client/server device in accordance with one or more embodiments.

FIG. 9 depicts a table setup routine 900 for generating or otherwise processing one or more pieces of media content in a distributed-media-library system from the perspective of a given viewing device, such as may be performed by a particular instance of a distributed-media client/server device 500.

In block 905, table setup routine 900 provides a media-library device list that identifies a plurality of media-library devices connected to a given media access device. This can occur, for example, in a context in which device 500E acts as a server by performing routine 900 on behalf of itself or on behalf of another viewing device 500F with which it is presently associated; in which a table 600 having multiple records 695A-D each describing a respective piece of media (residing in the viewing device, e.g.) is thereby generated and stored (in a memory 525 of device 500E or device 500F, e.g.).

Beginning in opening loop block 910, routine 900 processes each media-library device 500D-H presently available (i.e. at run time) to the server in turn.

Beginning in opening loop block 915, routine 900 processes each piece of media content presently available within the selected device in turn, optionally using a sort-key subroutine like that of FIG. 3.

In block 920, routine 900 receives or generates a device-centric sort field: a scalar quantity (of two or more bits or other data components, e.g.) signifying one or more quantifiable performance attributes of a connection between a particular data destination (viewing device, e.g.) and each data source (a media-library device or other repository containing media content of potential interest at that destination, e.g.). This can occur, for example, in a context in which the device-centric sort field is inversely correlated with a lower measured packet error rate, a more-immediate real-time response, a higher bandwidth, a lower percentage-of-downtime, or some other such scalar quantification empirically indicative of connectivity. In relation to a particular viewing device (a display 515 of device 500H, e.g.), for example, a device-centric sort field 702 may be "00" in relation to content within (a local media datastore 540 as a media-library device within) device 500H, "01" in relation to content within an instance of a media-library device 500A within central network 450B, "10" in relation to content residing within an instance of local network 450A that is remote from central network 450B, and a higher value in relation to content (in devices 500E-G) beyond local network 450A. Such device-centric sort keys (including field 702, e.g.) may be derived as a monotonic function of a recency-indicative timestamp 703 (indicating when each item was last accessed by the particular device, e.g.) or other such quantified indicia (provided in description 704, e.g.) of recency or relevance.

Likewise with respect to a device 500E (as the device about which the "device-centric" data of table 800 is centered), a suitable device-centric sort field 802 (expressed as a binary number, e.g.) may be "000" in relation to content within a datastore of device 500E, "010" in relation to a version of "Pirates of the Caribbean" residing within the local network 450A or central network 450B, "011" in relation to a version of "Toy Story 2" residing within client/server device 500G, and a higher value in relation to content in media-library devices that are further removed from device 500E (in device 500H, e.g.). Alternatively or additionally, description 804 residing in the same record 895 as a particular device-centric sort key may include one or more raw priority metrics (measurements, e.g.) from which the sort key was computed (by adding or multiplying two or more scalar indicia of close association as described above, e.g.).

In block 925, routine 900 adds/appends a record expressing both (one or more) intrinsic and (one or more) extrinsic quantities to the list of media content available to a particular viewing device. This can occur, for example, in a context in which block 925 adds a record 695D to a table 600 that had previously ended with records 695A-C and in which record 695D combines one or more intrinsic item attributes with one or more extrinsic item attributes pertaining to a prospective movie download or streaming service (by concatenation, e.g.).

An "extrinsic" parameter, as used herein, may refer a location of a content item or other such informational aspects about it that do not describe its essential nature. "Intrinsic" is not used herein to describe a parameter that is merely specific to a content item, but instead includes a genre, descriptive title, or other such determinants that substantially influence a device user's decision whether to download a convenient copy of the item. In regard to a viewing device accessing table 800 in regard to potentially retrieving "the Croods," for example, the content type index 801 of "4" and the movie title are intrinsic and the device-centric sort field 802 and the timestamp 803 indicating when the source device was last accessed are extrinsic. The device-centric sort key 792 may, in respective embodiments, be either "101" signaling the relative remoteness of the media-library device or "4101" signaling a concatenation or other combination of intrinsic and extrinsic attributes of the prospective service. Either such sort key may improve network/session performance improvement, for example, when adopted into a context in which the available options would otherwise fail to promote/endorse sources with high connectivity to the destination (by disregarding the perspective of the viewing device in ranking options, e.g.).

In ending loop block 930, routine 900 iterates back to opening loop block 915 to process the next identified piece of media content, if any. In some contexts, the resulting modified table 600, 700, 800 may (optionally) be stored in an instance of non-transitory computer readable media 530 local to the viewing device.

In ending loop block 935, routine 900 iterates back to opening loop block 910 to process the next identified media library device, if any.

Routine 900 ends in ending block 999, with the viewing-device-centric sort key determined for each table corresponding to a viewing device.

Figure 10:
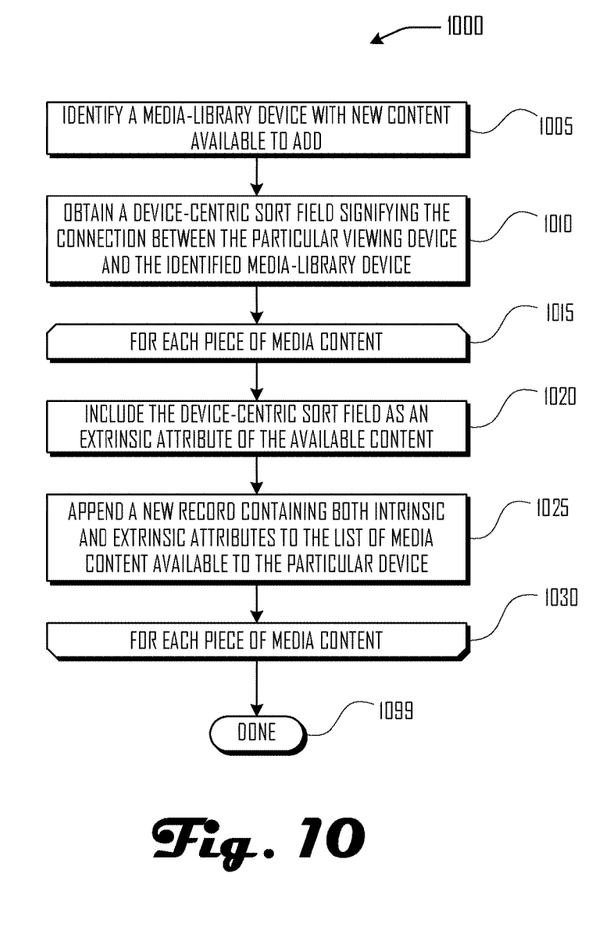
FIG. 10 depicts a table update routine, such as may be performed by a distributed-media client/server device in accordance with one or more embodiments.

FIG. 10 depicts a table update routine 1000 for generating or otherwise processing one or more pieces of media content in a distributed-media-library system from the perspective of a given viewing device, such as may be performed by a particular instance of a distributed-media client/server device 500 in accordance with one or more embodiments.

In block 1005, routine 1000 detects or otherwise obtains an identification of a media-library device on which there is stored at least one piece of media content previously unknown to a viewing device serviced by routine 1000. This can occur, for example, in a context in which the media-library device has recently come into communication with one of the above-described networks or in which the new content has recently been downloaded onto an existing media-library device.

In block 1010, routine 1000 generates or receives a device-centric sort field 602, 702, 802 signifying a direct or indirect connection between a particular viewing device and the identified media-library device, optionally using an empirical derivation like those described above. Alternatively or additionally, a frequency of access or other such indication of strong or weak association (i.e. between the particular viewing device and the identified media-library device) may influence the particular viewing device updating the value assigned to pieces of media content available in the media-library device. In some variants, moreover, block 1010 may obtain or verify the sort field from a user of the particular viewing device, such as by presenting a menu option by which the user can effectively select, adjust, update, or otherwise influence the sort field in response to detecting the new content or a newly-arrived media library device.

Beginning in opening loop block 1015, routine 1000 processes each piece of media content presently available within the media-library device.

In block 1020, routine 1000 includes the device-centric sort field as an extrinsic attribute of the available content. In relation to a particular viewing device (a display 515 of device 500H, e.g.), for example, a device-centric sort field 702 may be "00" in relation to content within (a local media datastore 540 as a media-library device within) device 500H, "01" in relation to content within an instance of a media-library device 500A within central network 450B, "10" in relation to content residing within an instance of local network 450A that is remote from central network 450B, and a higher value in relation to content (in devices 500E-G) beyond local network 450A.

In block 1025, routine 1000 adds/appends a record containing both intrinsic attributes and extrinsic attributes to the list of media content available to a particular viewing device. This can occur, for example, in a context in which block 1025 adds a record 695D to a table 600 that ends with records 695A-C and in which the record 695D includes a recency-indicative timestamp 603 indicating when the media-library device containing the item of media was last heard from or other intrinsic item attribute. This attribute is included with at least one extrinsic item attribute, both pertaining to a prospective movie download or streaming service, as described above with reference to block 930.

In ending loop block 1030, routine 1000 iterates back to opening loop block 1015 to process the next identified piece of media content, if any. Alternatively or additionally, the resulting modified table 600, 700, 800 may (optionally) be stored in an instance of non-transitory computer readable media 530 local to the viewing device.

Routine 1000 ends in ending block 1099, with the viewing-device-centric sort key determined for each table corresponding to a viewing device. Alternatively or additionally, block 920 may be configured to reduce a scalar device-centric sort field 702 from a higher default value (such as "111") to a lower adjusted value (such as "001") responsive to a quantification indicative of a short signal path (a faster-than-nominal time elapsed since a most-recent access signal resulting from close physical proximity of a media-library device 500F containing a copy of "the Lorax," e.g.).

Figure 11:
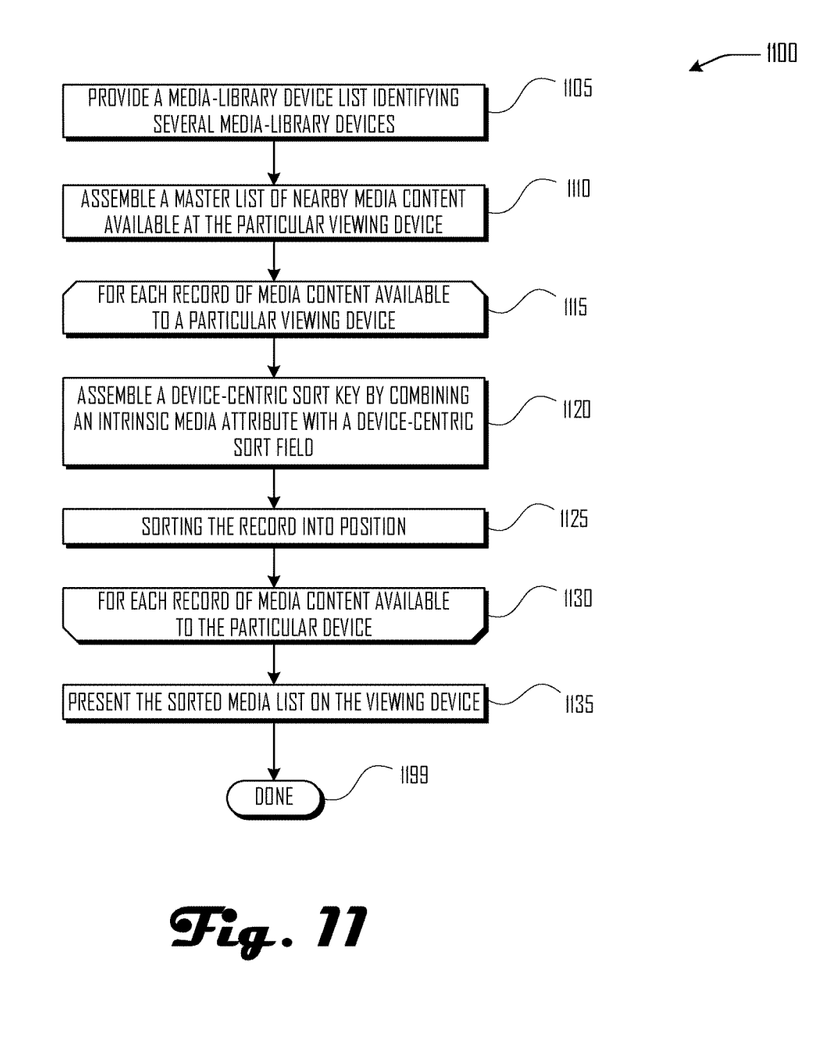
FIG. 11 depicts a presentation routine, such as may be performed by a distributed-media client/server device in accordance with one or more embodiments.

FIG. 11 depicts a presentation routine, such as may be performed by a distributed-media client/server device in accordance with one or more embodiments (as an automatic and conditional response to a particular viewing device 500 coming online in a new region, e.g.).

In block 1105, routine 1100 detects or otherwise obtains an identification of several media library devices having items of content available to the particular viewing device 500.

In block 1110, routine 1100 assembles a master list of distributed media content available at the particular viewing device 500 (within the device or other devices nearby, e.g.) like the tables 600, 700, 800 of FIGS. 6-8.

Beginning in opening loop block 1115, routine 1100 processes each record of media content available to the particular viewing device.

In block 1120, routine 1100 assembles a device-centric sort key by combining an intrinsic media attribute (type index 601, e.g.) with a device-centric sort field 602.

In block 1125, routine 1100 sorts the records in the table according to the sort key.

In ending loop block 1130, routine 1100 iterates back to opening loop block 1115 to process the next identified piece of media content, if any.

In block 1135, routine 1100 causes the sorted media list (the table, e.g.) to be presented at the particular viewing device 500 (via display 515, e.g.).

Routine 1100 ends in ending block 1199.

In light of teachings herein, numerous existing techniques may be applied for sorting records based on indicia as described herein without undue experimentation. See, e.g., U.S. Pat. No. 9,165,046 ("Core data synchronization systems and methods"); U.S. Pat. No. 9,031,953 ("Method and system to curate media collections"); U.S. Pat. No. 8,135,761 ("System and method for automatically creating a media archive from content on a recording medium"); U.S. Pat. No. 7,987,280 ("System and method for locating and capturing desired media content from media broadcasts"); U.S. Pat. No. 7,948,906 ("System and method for determining network conditions"); U.S. Pat. No. 7,805,315 ("Subscription management"); U.S. Pat. No. 7,774,235 ("Method and process for producing a sequence of data request user interfaces"); and U.S. Pat. No. 7,716,220 ("Content recommendation device with an arrangement engine"). The foregoing patents are incorporated herein to the extent not inconsistent herewith.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A computer-implemented method for prioritizing a piece of media content with respect to other pieces of media content in a distributed-media-library system from a perspective of a point-of-access device, the method comprising:
   identifying a plurality of media-library devices that collectively store a plurality of media files, each of which comprises a respective version of the piece of media content, at least some of which are associated with differing sort metadata;
   determining a plurality of priority metrics corresponding respectively to the plurality of media-library devices, each priority metric measuring an association between one of the plurality of media-library devices and the point-of-access device;
   selecting, according to the plurality of priority metrics, a media-library device that is closely-associated with the point-of-access device, the closely-associated media-library device storing a selected media file of the plurality of media files;
   determining, based on the sort metadata associated with the selected media file, a viewing-device-centric sort key for the piece of media content; and
   sorting the piece of media content according to the viewing-device-centric sort key with the selected media file prioritized with respect to the other pieces of media content in one or more others of the plurality of media-library devices not as closely associated with the point-of-access device including:
      sorting the piece of media content according to the viewing-device-centric sort key with the closely-associated media-library device storing the selected media file prioritized over the other pieces of the media content in one or more others of the plurality of media-library devices not as closely associated with the point-of-access device.

2. The method of claim 1, wherein the viewing-device-centric sort key comprises a date and time at which the selected media file was introduced onto the closely-associated media-library device.

3. The method of claim 1, wherein each priority metric measures a period of time since the point-of-access device and one of the plurality of media-library devices were connected to one another.

4. The method of claim 1, wherein selecting the closely-associated media-library device comprises:
   selecting a priority group comprising at least two of the plurality of media-library devices that are equally closely associated with the point-of-access device;
   identifying at least two of the plurality of media files as being stored respectively by the priority group; and
   selecting the closely-associated media-library device from among the priority group based on sort metadata associated with the at least two of the plurality of media files.

5. The method of claim 4, wherein selecting the closely-associated media-library device from among the priority group comprises selecting the closely-associated media-library device onto which one of the plurality of media files was introduced more recently than others of the priority group.

6. The method of claim 4, wherein selecting the closely-associated media-library device from among the priority group comprises selecting the closely-associated media-library device onto which one of the plurality of media files was introduced less recently than others of the priority group.

7. The method of claim 1, wherein the closely-associated media-library device is the point-of-access device.

8. The method of claim 1, further comprising sorting the piece of media content according to a second viewing-device-centric sort key with respect to the other pieces of media content when the piece of media content is viewed from a perspective of a second point-of-access device.

9. The method of claim 1, wherein sorting the piece of media content according to the viewing-device-centric sort key with the selected media file prioritized with respect to the other pieces of the media content in one or more others of the plurality of media-library devices not as closely associated with the point-of-access device includes:
   sorting the piece of media content as a real-time response to a request at the point-of-access device to view metadata about the media content.

10. The method of claim 1, wherein the determining the viewing-device-centric sort key for the piece of media content comprises:
    giving the piece of media content either a higher-priority metric based on the media-library repository that contains the piece of media content having recently communicated with the point-of-access device or a lower-priority metric based on the media-library repository that contains the piece of media content not having recently communicated with the point-of-access device.

11. The method of claim 1, wherein the determining the viewing-device-centric sort key for the piece of media content comprises:
    giving the piece of media content either a higher-priority metric based on the media-library repository that contains the piece of media content having recently become connected with the point-of-access device or a lower-priority metric based on the media-library repository that contains the piece of media content not having recently become connected with the point-of-access device.

12. A computing apparatus for prioritizing a piece of media content with respect to other pieces of media content in a distributed-media-library system from a perspective of a point-of-access device, the apparatus comprising a processor and a memory storing instructions that, when executed by the processor, configure the apparatus to:
    identify a plurality of media-library devices that collectively store a plurality of media files, each of which comprises a respective version of the piece of media content, at least some of which are associated with differing sort metadata;

determine a plurality of priority metrics corresponding respectively to the plurality of media-library devices, each priority metric measuring an association between one of the plurality of media-library devices and the point-of-access device;

select, according to the plurality of priority metrics, a media-library device that is closely-associated with the point-of-access device, the closely-associated media-library device storing a selected media file of the plurality of media files;

determine, based on the sort metadata associated with the selected media file, a viewing-device-centric sort key for the piece of media content; and sort the piece of media content according to the viewing-device-centric sort key with respect to the other pieces of media content when the piece of media content is viewed from the perspective of the point-of-access device, wherein the piece of media content is sorted according to the viewing-device-centric sort key with the closely-associated media-library device storing the selected media file prioritized over the other pieces of the media content in one or more others of the plurality of media-library devices not as closely associated with the point-of-access device.

13. The apparatus of claim 12, wherein the instructions that configure the apparatus to the viewing-device-centric sort key further comprise instructions configuring the apparatus to a date and time at which the selected media file was introduced onto the closely-associated media-library device.

14. The apparatus of claim 12, wherein each priority metric measures a period of time since the point-of-access device and one of the plurality of media-library devices were connected to one another.

15. The apparatus of claim 12, wherein the instructions that configure the apparatus to select the closely-associated media-library device further comprise instructions configuring the apparatus to:

select a priority group comprising at least two of the plurality of media-library devices that are equally closely associated with the point-of-access device;

identify at least two of the plurality of media files as being stored respectively by the priority group; and select the closely-associated media-library device from among the priority group based on sort metadata associated with the at least two of the plurality of media files.

16. The apparatus of claim 15, wherein the instructions that configure the apparatus to select the closely-associated media-library device from among the priority group further comprise instructions configuring the apparatus to select the closely-associated media-library device onto which one of the plurality of media files was introduced more recently than others of the priority group.

17. The apparatus of claim 15, wherein the instructions that configure the apparatus to select the closely-associated media-library device from among the priority group further comprise instructions configuring the apparatus to select the closely-associated media-library device onto which one of the plurality of media files was introduced less recently than others of the priority group.

18. A computer-implemented method for prioritizing a piece of media content with respect to other pieces of media content in a distributed-media-library system from a perspective of a point-of-access device, the method comprising:

identifying a plurality of media-library devices that collectively store a plurality of media files, each of which comprises a respective version of a piece of media content, at least some of which are associated with differing sort metadata;

determining a plurality of priority metrics corresponding respectively to the plurality of media-library devices, each priority metric measuring an association between one of the plurality of media-library devices and a point-of-access device;

selecting, according to the plurality of priority metrics, a media-library device that is closely-associated with the point-of-access device, the closely-associated media-library device storing a selected media file of the plurality of media files; and determining, based on the sort metadata associated with the selected media file, a viewing-device-centric sort key for the piece of media content; and causing a display associated with the point-of-access device to present an indication of the piece of media content sorted according to the viewing-device-centric sort key with the selected media file with the closely-associated media-library device storing the selected media file prioritized over other pieces of media content in one or more others of the plurality of media-library devices not as closely associated with the point-of-access device.

19. The method of claim 18, wherein the sorting the piece of media content with the closely-associated media-library device storing the selected media file prioritized over other pieces of media content in one or more others of the plurality of media-library devices not as closely associated with the point-of-access is performed as an automatic and conditional real-time response to a media list presentation request.

* * * * *